US010697430B2

(12) United States Patent
Al-Rubb (10) Patent No.: US 10,697,430 B2
(45) Date of Patent: Jun. 30, 2020

(54) TURBINE BLADE ARRANGEMENT

(71) Applicant: Khalil Abu Al-Rubb, Doha (QA)

(72) Inventor: Khalil Abu Al-Rubb, Doha (QA)

( * ) Notice: Subject to any disclaimer, the term of this patent is extended or adjusted under 35 U.S.C. 154(b) by 337 days.

(21) Appl. No.: 15/319,580

(22) PCT Filed: Jun. 16, 2015

(86) PCT No.: PCT/GB2015/051757
§ 371 (c)(1),
(2) Date: Dec. 16, 2016

(87) PCT Pub. No.: WO2015/193652
PCT Pub. Date: Dec. 23, 2015

(65) Prior Publication Data
US 2017/0122290 A1 May 4, 2017

(51) Int. Cl.
| | | |
|---|---|---|
| F03D 7/02 | (2006.01) | |
| F03D 1/02 | (2006.01) | |
| F03D 1/06 | (2006.01) | |
| B64C 27/00 | (2006.01) | |
| B64C 27/51 | (2006.01) | |

(52) U.S. Cl.
CPC .......... *F03D 7/0296* (2013.01); *B64C 27/001* (2013.01); *B64C 27/51* (2013.01); *F03D 1/025* (2013.01); *F03D 1/0633* (2013.01); *F03D 1/0675* (2013.01); *F03D 7/0236* (2013.01)

(58) Field of Classification Search
CPC ...... F03D 7/0236; F03D 7/022; F03D 7/0296; F03D 1/0675; F03D 1/0633; F03D 1/02; F03D 1/025; B64C 27/001; B64C 27/51; B64C 27/46008
See application file for complete search history.

(56) References Cited

U.S. PATENT DOCUMENTS

| | | | |
|---|---|---|---|
| 2,653,250 A | 9/1953 | Romani | |
| 6,457,671 B1 | 10/2002 | Sherman | |
| 7,632,070 B2 * | 12/2009 | Dawson | ................ F03D 7/0236 415/4.1 |
| 2010/0133838 A1 * | 6/2010 | Borgen | ..................... F03D 1/06 290/52 |
| 2010/0158687 A1 | 6/2010 | Dawson et al. | |
| 2010/0209247 A1 * | 8/2010 | Becker | .................. F03D 7/0224 416/1 |

(Continued)

FOREIGN PATENT DOCUMENTS

| | | |
|---|---|---|
| CN | 102953933 B | 1/2016 |
| DE | 3117996 A | 11/1982 |

(Continued)

OTHER PUBLICATIONS

European Examination Reprot; European Patent Office; European Application No. 15732881.6; dated Mar. 5, 2018; 3 pages.

(Continued)

*Primary Examiner* — Bryan M Lettman
(74) *Attorney, Agent, or Firm* — Taft Stettinius & Hollister LLP (57) ABSTRACT

A wind turbine arrangement including a first rotatable blade arrangement and a second rotatable blade arrangement. The first blade arrangement forms part of a first wind turbine, and the second blade arrangement forms part of a second wind turbine. The second wind turbine can produce a rotative force to the first wind turbine. At wind speeds below that required to operate the first turbine, the second turbine may be operable and provide power to rotate the first turbine.

22 Claims, 6 Drawing Sheets

(56) References Cited

U.S. PATENT DOCUMENTS

2011/0042962 A1 2/2011 Yoon
2011/0305570 A1 12/2011 Shin et al.

FOREIGN PATENT DOCUMENTS

| DE | 202011104782 U1 | 1/2012 |
| DE | 102012101068 A1 | 8/2013 |
| JP | 09177657 A | 7/1997 |
| JP | 09177658 A | 7/1997 |
| KR | 101057910 B1 | 8/2011 |
| KR | 201300733 A | 7/2013 |
| SU | 1048158 A1 | 10/1983 |
| WO | 2004011801 A | 2/2004 |
| WO | 2009043119 A1 | 4/2009 |
| WO | 2013014463 A2 | 1/2013 |

OTHER PUBLICATIONS

International Preliminary Report on Patentability; International Bureau of WIPO; International PCT Application No. PCT/GB2015/051757; dated Dec. 20, 2016; 12 pages.

Search Report; United Kingdom Intellectual Property Office; United Kingdom Application No. GB1410862.5; dated Feb. 13, 2015; 2 pages.

Examination Report; United Kingdom Intellectual Property Office; United Kingdom Application No. GB1410862.5; dated Feb. 13, 2015; 3 pages.

International Search Report; International Searching Authority; International PCT Application No. PCT/GB2015/051757; dated Nov. 23, 2015; 7 pages.

Written Opinion; International Searching Authority; International PCT Application No. PCT/GB2015/051757; dated Nov. 23, 2015; 11 pages.

* cited by examiner

TURBINE BLADE ARRANGEMENT

CROSS-REFERENCE TO RELATED APPLICATIONS

This application is a U.S. national stage filing of international Application No. PCT/GB2015/051757 filed on Jun. 16, 2015, which claims priority to Great Britain Application No. 141002.5 filed on Jun. 18, 2014, the contents of each application incorporated herein by reference in their entirety.

FIELD OF EMBODIMENTS OF THE INVENTION

Embodiments of the invention relate to blade arrangements for use with turbines and to turbines incorporating such blade arrangements.

BACKGROUND

As the dangers and environmental impact of traditional coal, oil, gas and nuclear power generation become better understood and appreciated, there is an increasing desire for alternative forms of generating power. In recent years, one of the more successful alternative methods of generating energy has been wind power. There are many different known arrangements for generating wind power, but most rely on the principle of providing a turbine having blades arranged to turn as a result of the force of the wind and to thereby generate energy.

The efficiency with which such wind-based electricity generation occurs depends upon the efficiency with which the kinetic energy of the wind can be converted into electrical energy which, in turn, depends upon the efficiency with which the blades can rotate about their axis of rotation.

Due to the manner in which wind turbines operate, the blades which rotate under the influence of the wind are often orientated to rotate vertically with respect to the ground. Therefore, for each up-stroke it is necessary to lift the blade against the force of gravity.

Furthermore, one of the known problems experienced during wind generation is that the blade arrangement (or the portion undergoing rotation due to the wind) is subjected to significantly varying forces as the speed of the wind changes. It is therefore known to vary the moment of inertia of the blade arrangement by varying a weight arrangement about an axis of rotation. Such an arrangement is, for example, disclosed in WO 2004/011801. However, such known arrangements vary the moment of inertia symmetrically about the axis of rotation. Furthermore, the means proposed for varying the moment of inertia rely on relatively expensive and friction-inducing arrangements.

Current turbines require a minimum wind speed to operate, provide a near linear increase in output power with an increase in wind speed, and have a maximum rated output power which, when achieved, does not increase with wind speed. Turbines produce the maximum output power as wind speed further increases up to a point when, at a predetermined wind speed, the turbine is shut down to protect it from damage. A problem of the current turbines is that the range of wind speeds at which the turbine can produce power is limited.

SUMMARY

A first aspect of the invention provides a wind turbine arrangement comprising a first rotatable blade arrangement; and a second rotatable blade arrangement operable to power rotation of the first blade arrangement.

Preferably, the second rotatable blade arrangement is rotatable at a lower wind speed than the first rotatable blade arrangement.

Preferably, the first rotatable blade arrangement has a plurality of blades with a greater diameter than a plurality of blades of the second rotatable blade arrangement.

Preferably, the first rotatable blade arrangement is coupled to the second rotatable blade arrangement by an electrical means and is operable to be powered by the second rotatable blade arrangement.

Preferably, the first rotatable blade arrangement is coupled to the second rotatable blade arrangement by a pneumatic means and is operable to be powered by the second rotatable blade arrangement.

Preferably, the pneumatic means comprises a pump operable to be powered the second rotatable blade arrangement; and an impeller operable to power the first rotatable blade arrangement; wherein the pump is operable to pump a fluid to the impeller.

Preferably, the first rotatable blade arrangement is coupled to the second rotatable blade arrangement and is operable to be powered by the second rotatable blade arrangement the by a mechanical means.

Preferably, the second rotatable blade arrangement is at least partially housed within a nacelle of the first rotatable blade arrangement.

Preferably, the first and second rotatable blade arrangements are supported by a single structure.

Preferably, the first rotatable blade arrangement and the second rotatable blade arrangement are coaxial.

Preferably, the first rotatable blade arrangement rotates about a first axis and the second rotatable blade arrangement rotates about a second axis, and the first axis is above the second axis.

Preferably, the first rotatable blade arrangement is supported by a first structure; and the second rotatable blade arrangement is supported by a second structure.

Preferably, wherein the first rotatable blade arrangement comprises a plurality of blades arranged to rotate about a first axis, and means for varying the moment of inertia of the first rotatable blade arrangement away from the first axis.

Preferably, the wind turbine arrangement further comprises a rotation detector for detecting a degree of rotation of the first rotatable blade arrangement, and a controller adapted to vary the moment of inertia in dependence on the detected position, wherein the moment of inertia of the first rotatable blade arrangement is dependent upon the degree of rotation of the first rotatable blade arrangement about the first axis.

Preferably, each blade of the first rotatable blade arrangement comprises means for varying the moment of inertia of a blade independently of the moment of inertia of the other blades.

Preferably, the moment of inertia of the blade is decreased when the motion of the blade counteracts a force of gravity and wherein the moment of inertia of the blade is increased when the motion of the blade coincides with the force of gravity.

Preferably, the wind turbine arrangement is disposed so that a longitudinal axis of the blades of the first rotatable blade arrangement is substantially perpendicular to a ground level, wherein the moment of inertia is increased when the blade rotates between about 7 and 180 degrees from the vertical, measured from a 12 o'clock position.

Preferably, the means for varying the moment of inertia is operable to vary the moment of inertia of all of the blades of the first rotatable blade arrangement simultaneously.

Preferably, the means for varying the moment of inertia is operable to vary the moment of inertia of all of the blades of the first rotatable blade arrangement simultaneously in reaction to a change in a wind speed.

Preferably, the means for varying the moment of inertia comprises a void provided in the blade and a pomp arranged to pump a first fluid into and oat of the void to vary the moment of inertia of the corresponding blade.

Preferably, the first fluid is denser than air. Alternatively, first fluid may be less dense than air.

Preferably, the wind turbine arrangement further comprises a first reservoir for the first fluid wherein the pump pumps the first fluid between the first reservoir and the void and wherein a location of the first reservoir is closer to the first axis than a location of the void.

Preferably, the means for varying the moment of inertia of a blade of the first rotatable blade arrangement comprises means for varying a distance between the blade and the first axis.

Preferably, the means for varying the distance between the blade and first axis comprises a hydraulic cylinder.

Preferably, the means for varying the moment of inertia of the blade of the first rotatable blade arrangement comprises a hub at the first axis, the hub is coupled to the blades of the first rotatable blade arrangement and is operable to rotate with the blades, and the hub comprises means to offset the moment of inertia of the hub from the first axis.

Preferably, the moment of inertia of the hub is offset from the first axis in a direction orthogonal to the first axis.

Preferably, the offset moment of inertia of the hub provides a rotational force to rotate the first rotatable blade arrangement about the first axis.

Preferably, the hub comprises a plurality of chambers at least partially offset from the first axis, and the inertia of each chamber is alterable by pumping a second fluid into and out of each chamber.

BRIEF DESCRIPTION OF THE DRAWINGS

Example embodiments of the invention are hereinafter described with reference to the accompanying diagrams which are not to scale and where.

DESCRIPTION OF EXAMPLE EMBODIMENTS

Figure 1:
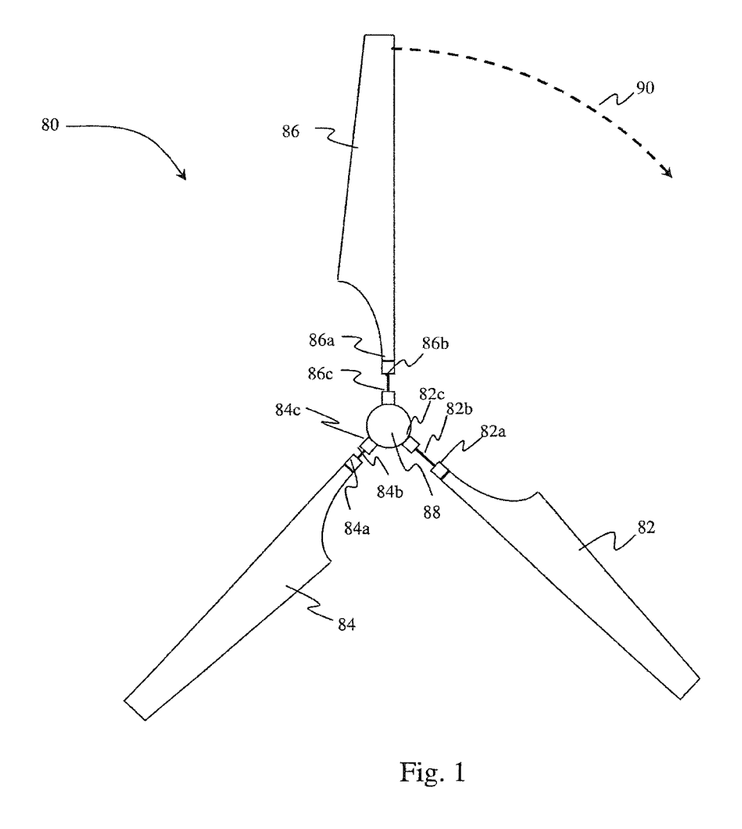
FIG. 1 is a schematic illustration of a blade arrangement.

FIG. 1 illustrates a blade arrangement 80. Blade arrangement 80 comprises blades 82, 84 and 86 arranged to rotate about axis 88 in the direction of arrow 90. Blade 82 comprises an anchor 82*a* located at an axial end of the blade 82. Anchor 82*a* is connected to an hydraulic cylinder 82*b* which is, in turn, connected to anchor 82*c*. Anchor 82*c* is connected to the axis 88 about which the blade 82 rotates. In a similar manner, blade 84 comprises anchor 84*a* attached to hydraulic cylinder 84*b*, attached to anchor 84*c*; and blade 86 comprises anchor 86*a* attached so hydraulic cylinder 86*b* attached, in turn, to anchor 86*c*. Both anchors 84*c* and 86*c* are attached to axis 88.

The hydraulic cylinders 82*b*, 84*b* and 86*b* operate to vary the distance between the respective anchors (82*a*, 84*a*, 86*a* and 82*c*, 84*c*, 86*c*). In this manner, the hydraulic cylinders 82*b*, 84*b* and 86*b* operate to vary the distance of the ends of the blades 82, 84 and 86 from axis 88. The moment of inertia of each of the blades 82, 84 and 86 may thereby be varied in dependence upon the location of the blade as it rotates in the circle described, in part, by arrow 90.

The precise manner in which the hydraulic cylinders 82*b*, 84*b* and 86*b* interact with their corresponding anchors 82*a*, 82*c*; 84*a*, 84*c*; and 86*a*, 86*c* is not illustrated in FIG. 1. However, a person skilled in the art would understand that a suitable hydraulic pump arrangement would be a suitable manner of arranging this, as would many other known arrangements.

Importantly, the hydraulic cylinders 82*b*, 84*b* and 86*b* vary the radial displacement of the corresponding blades 82, 84 and 86 as they rotate about axis 88. Therefore, as shown in FIG. 1, blade 82 is located furthest from the axis 88 whereas blade 84 is closest to the axis 88. Blade 86 occupies an intermediate position between that of blade 82 and that of blade 84.

The blades 82, 84 and 86 are rotating in the direction of arrow 90. Therefore the upstroke (the stroke which counteracts gravity) for any of the blades occurs substantially between the position of blade 84 and the position of blade 82 illustrated in FIG. 1. The distance between a blade and the axis 88 is reduced during this upstroke to reduce the moment of inertia of the blade.

Figure 2:
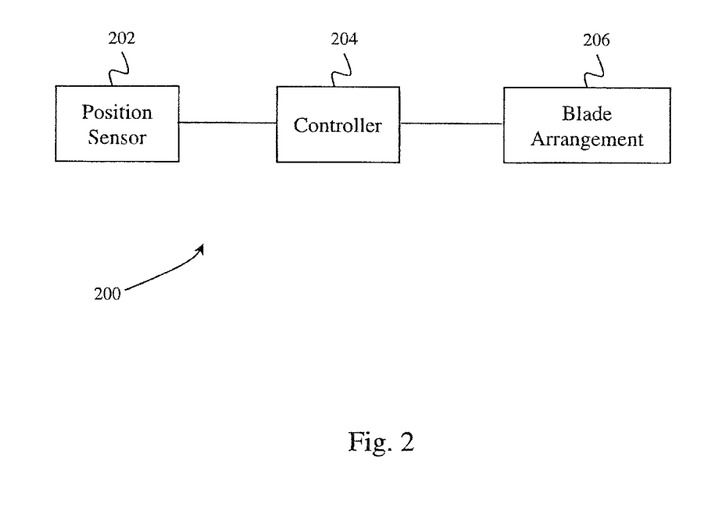
FIG. 2 is a schematic illustration of an arrangement for controlling the moment of inertia of a blade.

FIG. 2 illustrates an arrangement 200 to control the moment of inertia of the blades illustrated in FIG. 1, for example. The arrangement 200 comprises a sensor 202 to detect the angle of rotation of the rotatable arrangement [position of a particular blade in its circle of rotation]. Such a sensor could, for example, comprise a rotationally variable resistor, but many other such sensors are known in the art and will therefore not be further described herein.

The arrangement 200 further comprises a controller 204 which is attached to the blades of the blade arrangement 206. The position sensor 202 detects the position of a blade as it rotates about its axis of rotation. This position is communicated to the controller which then uses this information to vary the moment of inertia of each of the blades of the blade arrangement 206 to reduce that moment on the upstroke of the blade, and reduce it on the down stroke. In this manner, less energy is used to rotate the blade arrangements according to these arrangements when compared to known arrangements.

Figure 3:
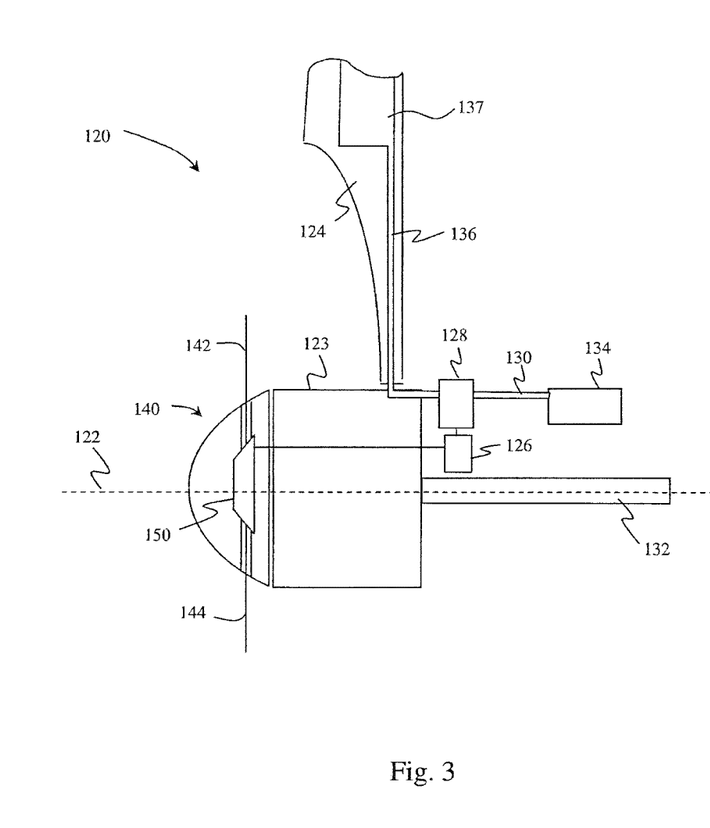
FIG. 3 is a schematic illustration of a blade arrangement according to a first embodiment.

Advantageously, the arrangements described above for changing the moments of inertia of an individual blade within a blade arrangement may be operated in concert. In this way, the moments of inertia of all blades in a blade arrangement can be changed simultaneously. This is particularly advantageous in a wind turbine where the efficiency of the wind turbine can be adjusted by adjusting the moments of inertia in accordance with the prevailing wind speed. It is to be understood that the two aspects may operate together (i.e. the moment of inertia of ail blades may be varied and the moments of inertia of each blade may vary in a range determined by the amount to which that for all blades has been varied). FIG. 3 is a schematic side illustration of details of an embodiment of the invention.

FIG. 3 illustrates a blade arrangement 120 for which a truncated single blade 124 is illustrated. Blade 124 is connected to a housing 123 which rotate about an axis 122. Blade 124 and housing 123 are attached to shaft 132 and rotation of the blade 124 due to its interaction with wind causes the housing and shaft to rotate. The shaft 132 is attached to an electricity generator (not shown) so that the arrangement 120 generates electricity in the manner of known wind generators. Attached to the housing 123 is a nacelle 140. In this embodiment, the nacelle 140 comprises a first nacelle blade 142 and a second nacelle blade 144. The nacelle blades 142 and 144 rotate about the nacelle 140 and are attached to a generator 150 so that movement of the nacelle blades 142 and 144 causes the generation of electricity by generator 150 in a known manner. The small auxiliary wind turbine comprising the nacelle blades 142, 144 and the generator 150 has a much lower cut in speed, hence it will operate at a much lower wind speed than required by the main blade 124.

In one embodiment, the small auxiliary wind turbine is a WINDTRONICS (®) wind turbine made by HONEYWELL (®) which has a cut in speed of 0.5 m/s or lower. This small auxiliary turbine can be fitted anywhere on the main turbine and not necessarily form part of the nacelle. Preferably, the auxiliary turbine is fitted as high as possible to expose it to as higher wind speeds as possible.

It is to be realised that the generator 150, which generates electricity by the action of blades 142 and 144, is distinct from the electricity generation generated by the blade arrangement 120. Instead, generator 150 is connected to a controller 126 which is, in turn, connected to a pump 128.

Pump 128 is connected to a conduit 130 which is connected to a reservoir 134. Pump 128 is further connected to a reservoir 137 located within blade 124, by means of conduit 136. Pump 128 and hydraulic reservoir 134 are located outside of the housing 123 and do not rotate together with the blade 124. Pump 128 is coupled to conduit 136 by a rotary union (not shown).

The controller 126 includes a sensor (not shown) for detecting the rotational location of blade 124 about the axis of rotation 122. Furthermore, the controller 126 operates the pump 128 to pump liquid (in this ease water) between reservoir 134 and reservoir 137 through conduits 130 and 136.

The arrangement 120 of FIG. 3 uses the wind to generate power to control the arrangement for varying the inertia of the blade 124. In this embodiment, the nacelle blades 142 and 144 use the prevailing wind to generate the power required to operate the arrangement which changes the moment of inertia of the blades. Advantageously, this generates the requisite power only when the power is required (i.e. when there is sufficient prevailing wind for the wind turbine to be operating).

In the aforementioned embodiments, the moments of inertia of one or more blades is varied in accordance with the rotational location of the blade. Preferably, the moment of inertia is increased when the blade rotates between about 7 and 180 degrees measured from the vertical. Alternatively, the moment of inertia is varied when the blade rotates between 25 and 135 degrees measured from the vertical. In further embodiments, the moment of inertia is continuously varied in a sinusoidal manner as the blade rotates.

Figure 4:
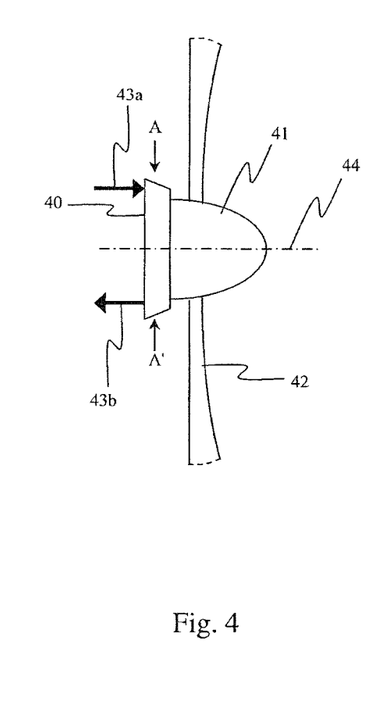
FIG. 4 is side view of a blade and hub arrangement.

FIG. 4 shows a blade and hub arrangement. A nacelle 41 is provided coupled to a plurality of main blades 42 (partially illustrated). The main blades 42 are operable to turn with the nacelle 41 about a central axis 44. A hub 40 is located at the rear of the main blades 42 and the nacelle 41 arrangement. The hub 40 is coupled to the main blades 42 whereby rotational movement of the main blades 42 is transferred to the hub 40, and vice versa. The hub 40 and main blade arrangement is coupled to a conventional turbine for generation of electrical power from rotational movement. The hub 40 is part of a fluid circuit and is able to receive 43a and provide 43b a fluid. Fluid is received 43a by the hub 40 at a point above the central axis 44 and provided 43b by the hub at a point below the central axis 44. Not shown are a plurality of auxiliary blades which rotate independently of the main blades 42 and are operable at lower wind speeds than the main blades 42, i.e. the auxiliary blades have a lower cut-in speed. The auxiliary blades are coupled to an auxiliary turbine which operates to generate electrical power used to pump fluid into 43a the hub 40. In use, the auxiliary blades are turned at a low wind speed. This low wind speed is insufficient to turn the main blades 42. The electrical power generated by the auxiliary turbine is used to pump fluid into/out of the hub 40.

Figure 5A:
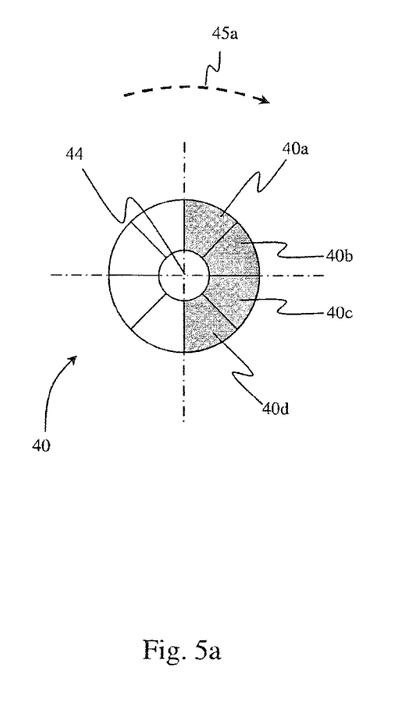
FIG. 5*a* is a sectional schematic view of the blade and huh arrangement.

FIG. 5a shows a sectional schematic view of the blade and hub arrangement across line A-A' of FIG. 4. FIG. 5a shows hub 40 comprising eight chambers arranged around the central axis 44. Four chambers are on the left of the central axis 44 and four chambers 40a, 40b, 40c, 40d are on the right. The hub 40 is arranged to rotate with the blades in the direction indicated by arrow 45a. In this embodiment, there are eight chambers. In other embodiments, the number of chambers can vary, but must equal three or more.

In use, electrical power from the auxiliary turbine is used to pump a fluid into a first chamber 40d, which would be an uppermost chamber on the right of the central axis 44. The hub 40 rotates 45a and a second chamber 40c takes the place of the first chamber 40d. The second chamber 40c is then positioned to receive fluid as the uppermost chamber to the right of the central axis 44. Fluid is pumped into the second chamber 40c whilst the hub 40 rotates 45a and a third chamber 40b of the hub takes the place at the uppermost chamber to the right of the central axis 44 and is filled with fluid. This continues until the first chamber 40d is the lowermost chamber to the right of the central axis 44 and a fourth chamber 40a is the uppermost chamber to the right of the central axis 44. All four chambers 40a, 40b, 40c, 40d contain fluid pumped into them at an upper point of the hub 40, and this is shown in FIG. 5a. The four chambers on the right 40a, 40b, 40c, 40d are shaded to represent them containing fluid. Fluid is then pumped out of each chamber (illustrated by arrow 43b in FIG. 4) when the chamber becomes the lowermost chamber to the right of the central axis 44. Pumping the fluid in to and out of the hub is performed in a manner so that the entry and exit of the fluid assists the rotation of the hub.

In an alternative arrangements, the electrical power generated by the auxiliary turbine is used to power a first pump to pump fluid out of 43b the hub 40 and/or a second pump to pump fluid into 43a the hub 40. The above-described continual filling and emptying of chambers on one side of the central axis 44 increases the mass of the chambers of that side of the hub 40 to be greater than the chambers of the non fluid filled side. The centre of inertia of the hub 40 of FIG. 5a is to the right of the central axis 44 due to the uneven distribution of fluid mass within the chambers of the hub 40. The offset centre of inertia provides a moment force about the central axis 44. As the chambers to the right of the central axis 44 are continually filled with the fluid, there will continue to be a moment acting on the hub 40 offset from the central axis 44. This offset moment provides a constant force to rotate the hub 40 about the central axis 44. A rotation of the hub 40 causes a corresponding rotation of the main blades 42. The initial rotation of the main blades, which requires a large amount of energy to overcome frictional forces within the main blade arrangement, is facilitated using energy generated from the movement of the auxiliary blades.

Pumping is disclosed above for adding fluid into die hub chambers, however, gravity may also be used to provide the force to inject the fluid. Further, the invention should not be limited to filling of a hub from the rear. Fluid may enter the hub via an upper surface of the hub and exit through a lower surface. The number of chambers should be at least two, but a hub may also comprise any greater number of chambers.

Figure 5B:
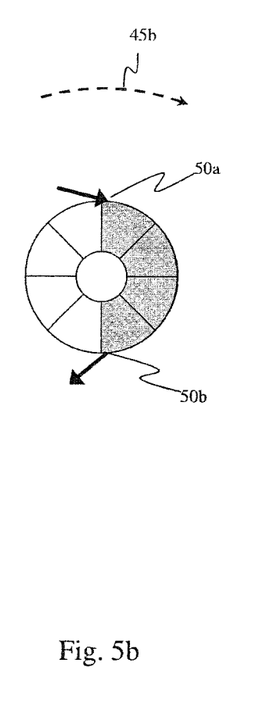
FIG. 5*b* is a sectional schematic view of a further hub arrangement.

FIG. 5b shows another hub rotatable in the direction of arrow 45b. In FIG. 4, the hub 40 is part of a fluid circuit and is able to receive 43a and provide 43b fluid via the rear of the hub 40. In the embodiment shown in FIG. 5b, fluid is received at an upper point 50a of the hub and removed at a lower point 50b of the hub. The upper point 50a is either an uppermost point or a point proximal to the uppermost point of an upper chamber. The lower point 50b is either a lowermost point or a point proximal to the lowermost point of a lower chamber. At the upper point 50a, the fluid is pumped in at an angle acute angle to the horizontal and in the direction of rotation 45b. This is so that the fluid provides an impulse to hub with a component of the impulse in the direction of movement 45a. At the lower point 50b, the fluid is pumped out at an angle acute angle to the horizontal and in the direction of rotation 45b. This is so that at least a component of a frictional force between the hub and the fluid exiting the hub is in the direction of movement 45a.

Figure 6:
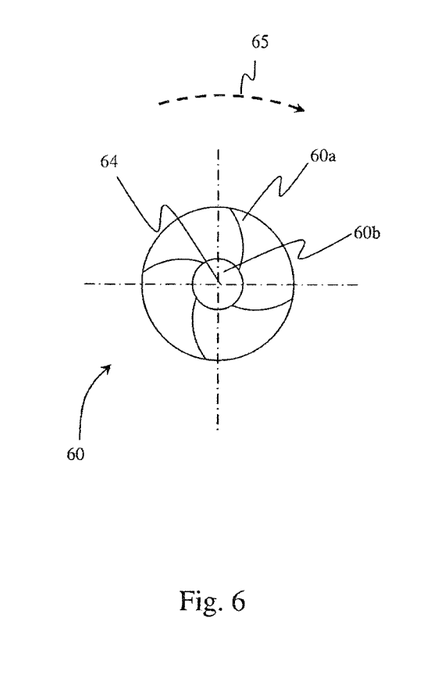
FIG. 6 is a sectional schematic view of an impeller.
Figure 7:
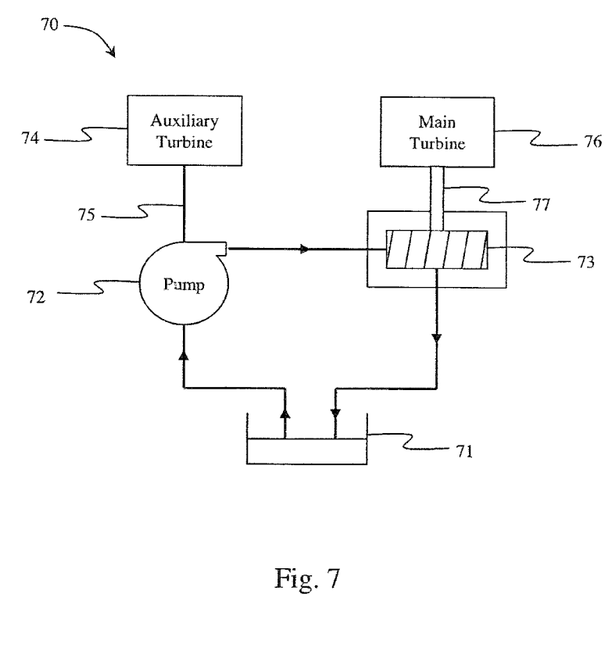
FIG. 7 is a schematic illustration of a second embodiment.

FIG. 6 shows an impeller 60 for rotatably coupling an auxiliary turbine to a main turbine. The impeller 60 has a central eye 60b which acts as an open inlet to accept incoming fluid and a plurality of vanes 60a to push the fluid radically leading from the central eye 60b to an outer edge. The impeller 60 is rotatable about an axis 64 in the direction of arrow 65. FIG. 7 shows a fluid store 71 providing a reservoir of pneumatic fluid for transferring energy around a pneumatic system 70, which incorporates the impeller of FIG. 6. A pump 72 is operable to pump fluid from the fluid store 71 through an impeller 73 before the fluid is returned to the fluid store 71, which completes a pneumatic circuit. The pump 72 is powered by an auxiliary turbine 74 and is coupled to the auxiliary turbine 74 by a pump coupling 75. In one embodiment, the pump coupling 75 comprises an electrical conductor and a motor whereby energy is transferred from the auxiliary turbine 74 to the pump 72 using electricity. In another embodiment, the pump coupling 75 comprises a further fluid pump coupled to a further impeller and a rotation of the auxiliary turbine 74 pumps fluid to turn the further impeller, thus powering the pump 72; and in a yet further embodiment, the pump coupling 75 comprises a physical linkage between the pump 72 and the auxiliary turbine 74.

The main turbine 76 is coupled to the impeller 73 by a main turbine shaft 77. The main turbine shaft 77 mechanically connects the impeller 73 to the main turbine 76. Pneumatic fluid passing through the impeller 73, driven by the pump 72, turns the impeller 73, which turns the main turbine shaft 77 and powers the main turbine 76.

In use, energy produced by the auxiliary turbine 74 from powered rotation of a set of auxiliary blades (not shown) powers the pump 72. The pump 72 pumps pneumatic fluid around the pneumatic circuit and through the impeller 73 powering the main turbine 76 and also powering the rotation of a set of main turbine blades (not shown) coupled the main turbine 76. In accordance with other embodiments, the set of auxiliary blades coupled to the auxiliary turbine 74 is rotatable at a wind speed lower than that required to torn the main turbine blades coupled to the main turbine 76.

Figure 8:
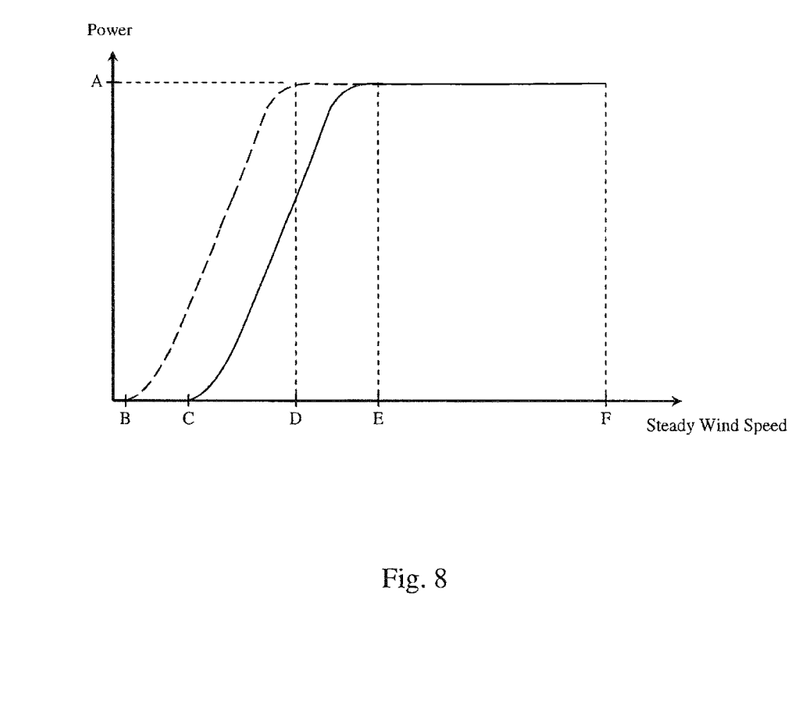
FIG. 8 is a graphic illustration of a power output of wind turbines.

FIG. 8 shows a graph where the power output of a wind turbine is plotted on the vertical axis against the steady wind speed which the turbine is subjected to on the horizontal axis. The solid line plotted on the graph represents a conventional wind turbine, whereby a minimum wind speed is required to turn a turbine to generate power. This minimum wind speed, or cut-in speed, corresponds to point C on the graph. As wind speed increases, the power generated by (be turbine increases until it reaches a maximum rated output power A which occurs at a rated output wind speed E. As wind speed increases further, the output power of the turbine does not increase and remains at the maximum rated output power A. When the wind speed reaches a cut-out speed, the turbine is shut down to protect it from damage, and the generated power is zero. Thus, the distribution of wind speeds which provide for power generation range from C to F of the graph, and the rated output power A is achieved between she wind speed range of E to F.

A wind turbine in accordance with an above-described embodiment provides an apparatus for increasing the above-mentioned ranges of wind speeds. An auxiliary turbine, which can operate at low wind speeds, is used to offset the moment of inertia of either a group of main turbine blades or a hub coupled to the main turbine blades. An additional rotation force is provided by gravity acting on the offset moment, thus providing a force to rotate the main turbine blades at a wind speed below that previously required to turn the main turbine blades. The additional force lowers the cut-speed of the main turbine and the cut-in speed of wind required to begin generating power from the main turbine is reduced to a speed (point B of FIG. 8) below that previously required to turn the main turbine blades. The output power of the turbine reaches the rated output power A at a lower wind speed D than a turbine without an additional force, but the inertia offsetting mechanisms of embodiments of the invention are configurable, so the turbine can be used until the cut-out wind speed F is reached. Thus, a wind turbine fitted with an embodiment of the invention may function at an extended range of wind speeds (B to F), achieve the rated output power at an extended range of wind speeds (D to F).

A wind turbine may comprise any combination of the above embodiments.

The invention claimed is:

1. A wind turbine arrangement, comprising:
  a first rotatable blade arrangement; and
  a second rotatable blade arrangement operable to power rotation of the first blade arrangement, wherein the first rotatable blade arrangement and the second rotatable blade arrangement are operable to rotate independently of one another;
  wherein the first rotatable blade arrangement comprises:
    a plurality of blades arranged to rotate about a first axis; and means for varying a moment of inertia of the first rotatable blade arrangement away from the first axis, the means for varying the moment of inertia comprising a void provided in a corresponding one of the plurality of blades and a pump arranged to pump a first fluid into and out of the void to vary the moment of inertia of the corresponding one of the plurality of blades.

2. The wind turbine arrangement according to claim 1, wherein the first rotatable blade arrangement is coupled to the second rotatable blade arrangement and is operable to be powered by the second rotatable blade arrangement by a mechanical means.

3. The wind turbine arrangement according to claim 1, wherein the second rotatable blade arrangement is at least partially housed within a nacelle of the first rotatable blade arrangement.

4. The wind turbine arrangement according to claim 1 further comprising a rotation detector for detecting a degree of rotation of the first rotatable blade arrangement, and a controller adapted to vary the moment of inertia in dependence on the detected position, wherein the moment of inertia of the first rotatable blade arrangement is dependent upon the degree of rotation of the first rotatable blade arrangement about the first axis.

5. The wind turbine arrangement according to claim 1, wherein the means for varying the moment of inertia of the first rotatable blade arrangement varies a moment of inertia of each of the plurality of blades.

6. The wind turbine arrangement according to claim 1 wherein the means for varying the moment of inertia is operable to vary the moment of inertia of all of the blades of the first rotatable blade arrangement simultaneously in reaction to a change in a wind speed.

7. The wind turbine arrangement according to claim 1 wherein the first fluid is denser than air.

8. The wind turbine arrangement according to claim 1 wherein first fluid is less dense than air.

9. The wind turbine arrangement according to claim 1 further comprising a first reservoir for the first fluid wherein the pump pumps the first fluid between the first reservoir and the void and wherein a location of the first reservoir is closer to the first axis than a location of the void.

10. The wind turbine arrangement according to claim 1 wherein the means for varying the moment of inertia of a blade of the first rotatable blade arrangement comprises means for varying a distance between the blade and the first axis.

11. The wind turbine arrangement according to claim 10 wherein the means for varying the distance between the blade and first axis comprises a hydraulic cylinder.

12. The wind turbine arrangement according to claim 1, wherein the first rotatable blade arrangement is connected to a first hub, and wherein the second rotatable blade arrangement is connected to a second hub.

13. A wind turbine arrangement, comprising:
a first rotatable blade arrangement; and
a second rotatable blade arrangement operable to power rotation of the first blade arrangement;
wherein the first rotatable blade arrangement comprises:
a plurality of blades arranged to rotate about a first axis; and
means for varying a moment of inertia of the first rotatable blade arrangement away from the first axis;
wherein the means for varying the moment of inertia of the corresponding one of the plurality of blades of the first rotatable blade arrangement comprises a hub at the first axis,
wherein the hub is coupled to each of the plurality of blades of the first rotatable blade arrangement and is operable to rotate with each of the plurality of blades, and
wherein the hub comprises means to offset a moment of inertia of the hub from the first axis.

14. The wind turbine arrangement according to claim 13 wherein the moment of inertia of the hub is offset from the first axis in a direction orthogonal to the first axis.

15. The wind turbine arrangement according to claim 14 wherein the offset moment of inertia of the hub provides a rotational force to rotate the first rotatable blade arrangement about the first axis.

16. The wind turbine arrangement according to claim 14, wherein the hub comprises a plurality of chambers at least partially offset from the first axis, and the inertia of each chamber is alterable by pumping a second fluid into and out of each chamber.

17. The wind turbine arrangement according to claim 16 wherein the second fluid is denser than air.

18. The wind turbine arrangement according to claim 16 wherein the amount of fluid pumped into each of the plurality of chambers is regulated to control the offset the moment of inertia of the hub from the first axis.

19. The wind turbine arrangement according to claim 16 wherein the plurality of chambers are equally spaced about the first axis.

20. The wind turbine arrangement according to claim 16 wherein a first chamber is one of the plurality of chambers, the second fluid is pumped into the first chamber of the hub at a first point of rotation and pumped out of the first chamber at a second point of rotation, and the first point has a greater gravitational potential than the second.

21. The wind turbine arrangement according to claim 20 wherein a second chamber is one of the plurality of chambers, and the second fluid is pumped into the second chamber of the hub at the first point of rotation and pumped out of the second chamber at the second point of rotation.

22. The wind turbine arrangement according to claim 13 wherein the means for varying the moment of inertia comprises:
a void provided in the corresponding one of the plurality of blades; and
a pump arranged to pump a first fluid into and out of the void to vary the moment of inertia of the corresponding one of the plurality of blades.

* * * * *